US008554920B2

(12) United States Patent
Chen et al.

(10) Patent No.: US 8,554,920 B2
(45) Date of Patent: Oct. 8, 2013

(54) LINKED EQUIVALENT CELL HEADER-BASED APPROACH AND PROTOCOL FOR ORGANIZING AN AD-HOC NETWORK

(75) Inventors: Wai Chen, Parsippany, NJ (US); John Lee, Howell, NJ (US); Marcus Pang, Manalapan, NJ (US); Shengwei Cai, Florham Park, NJ (US); Toshiro Hikita, Fort Lee, NJ (US)

(73) Assignees: Telcordia Technologies, Inc., Piscataway, NJ (US); Toyota Infotechnology Center, U.S.A., Inc., Palo Alto, CA (US)

( * ) Notice: Subject to any disclaimer, the term of this patent is extended or adjusted under 35 U.S.C. 154(b) by 620 days.

(21) Appl. No.: 11/284,731

(22) Filed: Nov. 22, 2005

(65) Prior Publication Data
US 2007/0115897 A1    May 24, 2007

(51) Int. Cl.
G06F 15/16    (2006.01)
H04L 12/28    (2006.01)

(52) U.S. Cl.
USPC ........... 709/227; 709/238; 709/338; 370/252; 370/255; 370/328

(58) Field of Classification Search
USPC .................. 370/338, 328, 254, 255, 252, 331
See application file for complete search history.

(56) References Cited

U.S. PATENT DOCUMENTS

| | | | |
|---|---|---|---|
| 6,721,632 B2 | 4/2004 | Fallenstein | |
| 7,046,631 B1 * | 5/2006 | Giroux et al. | 370/234 |
| 7,281,057 B2 * | 10/2007 | Cain | 709/238 |
| 2003/0041150 A1 * | 2/2003 | Passman et al. | 709/227 |
| 2003/0091014 A1 * | 5/2003 | Meier | 370/338 |
| 2003/0187570 A1 * | 10/2003 | Impson et al. | 701/117 |
| 2004/0003111 A1 * | 1/2004 | Maeda et al. | 709/237 |
| 2004/0018839 A1 | 1/2004 | Andric et al. | |
| 2005/0002347 A1 | 1/2005 | Lee et al. | |
| 2005/0041676 A1 * | 2/2005 | Weinstein et al. | 370/401 |
| 2005/0232185 A1 | 10/2005 | Hudson et al. | |
| 2007/0115868 A1 * | 5/2007 | Chen et al. | 370/315 |

FOREIGN PATENT DOCUMENTS

| | | |
|---|---|---|
| WO | 97/25826 A | 7/1997 |
| WO | 02/09340 A | 1/2002 |

OTHER PUBLICATIONS

A. B. McDonald and T.F. Znati, "A Mobility Based Framework for Adaptive Clustering in Wireless Ad-Hoc Networks", *IEEE Journal on Selected Areas in Communications*, vol. 17, No. 8, Aug. 1999, pp. 1466-1487.
W. Chen and S. Cai, "Ad Hoc Peer-To-Peer Network Architecture for Vehicle Safety Communications", *IEEE Communications Magazine*, vol. 43, No. 4, Apr. 2005, pp. 100-107.

(Continued)

*Primary Examiner* — Mark Rinehart
*Assistant Examiner* — Andrew Oh
(74) *Attorney, Agent, or Firm* — Philip J. Feig (57) ABSTRACT

Establishing and maintaining a moving ad-hoc network is provided. The ad-hoc network includes a plurality of equivalent cells communicationally linked together to form a linked equivalent cell network. An equivalent cell header manages each equivalent cell. Additionally, regular nodes, scattered throughout the equivalent cell network, may be provided. Regular nodes have restricted communication privileges compared to the equivalent cell headers. However, equivalent cell headers can be demoted to regular nodes and regular nodes can be promoted to equivalent cell headers as required by equivalent cell network.

22 Claims, 8 Drawing Sheets

(56) References Cited

OTHER PUBLICATIONS

C. R. Lin and M. Gerla, "Adaptive Clustering for Mobile Wireless Networks", IEEE Journal on Selected Areas in Communication, vol. 15, Sep. 1997, pp. 1265-1275.

FleetNet—Internet on the Road, "Ad Hoc Radio Network for Inter-Vehicle Communications", DaimlerChrysler AG, Fleetnet: www.fleetnet.de, Jan. 2002.

J. Tian et al, "Routing Protocol Implemention", CarTalk, Information Society Technologies, Oct. 30, 2003, pp. 1-41.

P.L.J. Morsink et al, "Preliminary Design of an Application for Communication Based Longitudinal Control in the CarTalk2000 Project", CarTalk, Information Society Technologies, pp. 1-13, Oct. 30, 2003.

C. Cseh, DCA et al,"CommunicationArchitecture"2002 CarTalk 2000 Consortium, Oct. 28, 2002, pp. 1-145.

H. Wu et al "SYN-MAC: A Distributed Medium Access Control Protocol for Synchronized Wireless Networks", *Proceedings of IEEE International Conference on Network Protocols* (ICNP) 2003, Atlanta, GA, pp. 1-23.

J. Li et al, "Capacity Evaluation of Multi-Channel Multi-Hop Ad Hoc Networks", *IEEE International Conference on Personal Wireless Communications*, ICPWC 2002, pp. 1-4.

H. Füßler et al, "Contention-Based Forwarding for Mobile Ad-Hoc Networks", Ad Hoc Wireless Networks Journal, Elsevier, Nov. 2003, pp. 351-369.

ASTM E2213-03 Standard Specification for Telecommunications and Information Exchange Between Roadside and Vehicle Systems—5 GHz Band Dedicated Short Range Communications(DSRC) Medium Access Control (MAC) and Physical Layer (PHY) Specifications, Book of Standards 04.03, ASTM International.

F. Borgonovo, "MAC for Ad-Hoc Inter-Vehicle Network: Services and Performance", *Proceedings of the 58th IEEE Semiannual Vehicular Technology Conference*, Oct. 6-9, 2003, pp. 2789-2793.

J. Yin, "Performance Evaluation of Safety Applications Over DSRC Vehicular Ad Hoc Networks", First ACM Workshop on Vehicular Ad Hoc Networks (VANET 2004), Oct. 1, 2004, Philadelphia, PA, pp. 1-9.

C. Maihöfer et al, "Performance Evaluation of Stored Geocast", *The 58th IEEE Semiannual Vehicular Technology Conference (VTC)*, Orlando, FL, Oct. 2003, pp. 1-6.

R. Schollmeier et al, "Routing in Mobile Ad Hoc and Peer-To-Peer Networks. A Comparison", Second International Conference on Peer-To-Peer Computing (P2P'02), 2002, pp. 1-15.

Y. Kwon et al, "A Novel MAC Protocol with Fast Collision Resolution for Wireless LANs", *IEEE INFOCOM 2003*, Mar. 30-Apr. 3, 2003, San Francisco, CA, pp. 1-10.

J. Aceves et al, "The Core-Assisted Mesh Protocol" *IEEE Journal on Selected Areas in Communications*, Special Issue on Ad-Hoc Networks, vol. 17, No. 8, Aug. 1999, pp. 1380-1394.

I. Chisalita and N. Shahmehri, "A Peer-To-Peer Approach to Vehicular Communication for the Support of Traffic Safety Applications," *5th IEEE Conference on Intelligent Transportation Systems*, Sep. 2002.

H. Reumerman et al, "The Application-Based Clustering Concept and Requirements for Intervehicle Networks", *IEEE Communications Magazine*, Apr. 2005, pp. 108-113.

International Search Report, dated Aug. 23, 2007.

\* cited by examiner

LINKED EQUIVALENT CELL HEADER-BASED APPROACH AND PROTOCOL FOR ORGANIZING AN AD-HOC NETWORK

RELATED APPLICATION

This application is related to co-pending, concurrently filed and commonly owned application entitled "Group-Header Based Method to Organize Local Peer Group of Vehicles for Inter-Vehicle Communication."

FIELD OF THE INVENTION

This invention relates to an ad-hoc wireless network for a communication in a mobile environment. More specifically, the invention relates to establishment and maintenance of a moving device to moving device ad-hoc wireless network to achieve near-instantaneous communications.

BACKGROUND OF THE INVENTION

Wireless technology has become common in all aspects of life today, whether it be a wireless home or office network, so-called "hotspot" networks at local cafes, fast food chains or hotels, or even citywide implementations of WiFi technologies. The aim of this wireless push in society is to provide accessibility to information and to increase the productivity that society as a whole has enjoyed through the wide acceptance and utilization of computer networks and, especially, the Internet. Wireless networking technology, such as 802.11a/b/g, allows WiFi-enabled devices to connect to each other as they would in a standard wired network, without the restriction of wires. People are given the freedom to remain connected to a network regardless of their physical location within the network coverage area.

In this drive for greater wireless connectivity, one area of everyday life has lagged behind. The roads and highways of America have remained largely untouched by wireless technology beyond satellite position and cellular phone systems. However, there are many advantages to be gained from wireless network technology implementations on American roads. Among the most notable are traffic advisories, Amber alerts, weather advisories, etc., which could be relayed to all vehicles that may be affected on an immediate basis.

Further, networking automobiles together allows the relay of information about a vehicle that may affect other vehicles in the vicinity. For example, an automobile may suddenly brake; this action could be reported to all vehicles behind the braking automobile instantaneously, thus allowing the drivers of the other vehicles to take necessary action with less urgency. This aspect has clear implications for reducing traffic accidents and congestion. This type of wireless networking may appear in many aspects of vehicle safety applications, including, but not limited to, urgent road obstacle warning, intersection coordination, hidden driveway warning, lane-change or merging assistance.

Vehicle safety communications ("VSC") may be broadly categorized into vehicle-to-vehicle and vehicle-with-infrastructure communications. In vehicle-to-vehicle communication, vehicles communicate with each other without support from stationary infrastructure. Vehicles communicate with each other when they are within radio range of each other, or when multiple-hop relay via other vehicles is possible. In vehicle-with-infrastructure communication, vehicles communicate with each other with the support of infrastructure such as roadside wireless access points. In this case, vehicles may also communicate with the infrastructure only.

Key VSC performance requirements include low latency (on the order of 100 millisecond) and sustained throughput (or equivalently, the percentage of neighboring vehicles that successfully receive warning messages) in order to support various VSC applications such as collision avoidance.

Simply installing wireless antenna on a moving vehicle and then transmitting uncoordinated communications would not suffice for satisfying these requirements. Specifically, by transmitting uncoordinated data, the airwaves would be flooded with a plurality of messages, which would result in a jamming of the radio waves, as the radio bandwidth is limited.

As such, these vehicles would interfere with each other's transmission and compete with each other for radio bandwidth for transmission. Further, all messages would propagate in all directions without any consideration of a desired transmission direction.

Additionally, each vehicle would not match other vehicles' network configurations. The high mobility and lack of inherent relationships make a priori configuration of vehicles into vehicle groups problematic (i.e., no vehicle knows anything about its neighbors beforehand). All information that is necessary for setting up safety communications must be exchanged in near real-time among vehicles, and vehicles in the groups must configure themselves in near real-time so that safety communication can take place. The high mobility of uncoordinated vehicles implies frequent change of neighbors or vehicle groups, and poses difficulties of using support-servers (for mobility, address, name, media session) within vehicle groups. These key differences make existing tactical ad-hoc networking technologies not directly applicable to vehicle groups for safety communications.

Using WiFi methods employed elsewhere, such as hotspots, are impractical because of coverage, data traffic volume and latency issues. A normal rush hour commute in a major city could yield a vehicle density of as much as 600 vehicles per 1200-meter length of a 3-lane highway. In addition, all these vehicles are moving through individual coverage areas at a rate of 30 to 60 mph. Most wireless systems are not equipped to handle such a large rate of change in their network.

Specifically, as a vehicle enters the coverage area, it would need to be identified and issued configuration instructions by a wireless access point or router. When a vehicle leaves the coverage area, the wireless access point or router would need to update its records to remove the vehicle from its network. Thus, the speed of a vehicle through a particular coverage area determines the frequency of information updates, i.e., handshaking needs to be broadcast by the wireless access point or router and responded to by all the vehicles in range. All these vehicles transmitting information at the same time could very easily overwhelm the system in short order.

Several attempts have been made to establish a vehicle-to-vehicle communication network. For example, FleetNet and CarTalk2000 have both developed a vehicle-to-vehicle communication network. Both of these systems used a GPS system in each vehicle for location information. FleetNet uses both fixed and moving nodes as the infrastructure for "ad-hoc" networks. The fixed node can act as a server router, a gateway router and a client server router. This use of a plurality of fixed nodes causes a significant financial cost and overhead to set up, maintain, and manage the infrastructure. Additionally, the FleetNet system uses position based routing and location awareness. Specifically, as the backbone for their system, position data plays a crucial role in the communication protocols deployed.

CarTalk2000 also uses a position-based protocol. Each vehicle participating in the CarTalk2000-based inter-vehicle system must be equipped with GPS devices to detect its current position at any given time. Additionally, CarTalk2000 uses multiple different routing protocols, such as topological information routing, procedure routing, and reactive routing—such as Ad-hoc On-demand Distance-Vector Protocol, Dynamic Source Routing, hybrid routing, etc. Each of these protocols uses a complex and distinct set of protocol rules.

A major drawback of the CarTalk2000 system is the discovery of neighboring nodes significantly increases bandwidth traffic. Each node periodically sends a beacon to its neighboring cars reporting its existence. In high traffic areas, this can result in beacon message collision.

However, these GPS networks have a significant drawback. In a high-mobility vehicle environment, the GPS information quickly becomes outdated. The exchange of constantly changing GPS information among vehicles, in order to perform GPS-positional routing, incurs too much protocol overhead and wireless bandwidth waste. As a result, such GPS-positional routing technology cannot achieve minimal communication latency or sustained multiple-hop throughput.

Accordingly, there exists a need to create an ad-hoc network capable of achieving the stringent VSC performance requirements while achieving minimal communication latency or sustained multiple-hop throughput without requiring excessive bandwidth and significant protocol overhead.

SUMMARY OF THE INVENTION

An object of the invention is to create appropriate communication boundaries for a moving device to moving device communication by grouping a plurality of moving devices into a management group, such as a Local Peer Group ("LPG"), to coordinate and relay message transmission and to control the range and direction of the message propagation.

Additionally, an object of the present invention is to provide a simple protocol for establishing the Local Peer Groups, and a protocol for transmission of data between nodes—both intragroup and intergroup.

Further, an object of the present invention is to provide an ordered network where at least some members of the network are aware of their position in the network relative to other members of the network.

Accordingly, a method for establishing and maintaining a moving ad-hoc network between a plurality of moving wireless devices is provided by way of the present invention. The method includes the step of operating a first device of the plurality of moving wireless devices as a first equivalent cell header (ECH). The first ECH establishes a first equivalent cell (EC). The first EC is formed centralized within an area of a radio coverage range of the first ECH and dimensioned to occupy a portion of the area. The EC is managed by the ECH.

Additionally, the step of broadcasting ECH information (ECH_HELLO) message from the first ECH is provided. The ECH_HELLO message announces that the one device of the plurality of moving wireless devices is the first ECH. The ECH_HELLO message broadcasts occur at randomly determined fixed intervals, such that each ECH has an interval that differs from other ECHs.

Additional steps provide for receiving, by the first wireless device, at least second ECH_HELLO messages broadcast from at least a second moving wireless device operating as at least a second ECH, creating a linked equivalent cell network between the first and second ECH nodes if the second ECH is the only other ECH_HELLO message received or if two or more received ECH_HELLO messages belong to unlinked ECH nodes. However, if two or more received ECH_HELLO messages belong to a unified chain of linked ECH nodes, the first device operates as a regular node in the linked equivalent cell network. The regular node is part of the linked equivalent cell network, but has restricted communication privileges in comparison to an ECH.

Further, the steps of detecting mobility of an ECH belonging to the equivalent cell network and electing a new ECH based upon a predetermined election criterion are provided. The ECH election is performed by selectively promoting a regular node to an ECH. The regular node is selected based on a position of the regular node relative to the equivalent cell managed by the mobility-detected ECH. Mobility includes: a new ECH joining the EC network, a linked ECH leaving the EC network, and a linked ECH moving into an EC managed by another ECH of the same EC network.

A system for establishing a mobile ad-hoc network between a plurality of moving wireless devices is also provided. The system includes means for operating a first device of the plurality of moving wireless devices as a first equivalent cell header (ECH). The first ECH establishes a first equivalent cell (EC). The first EC is formed centralized within an area of a radio coverage range of the first ECH and dimensioned to occupy a portion of the area. The EC is managed by the ECH.

Additionally, means for broadcasting ECH information (ECH_HELLO) message from the first ECH is provided. The ECH_HELLO message announces that the one device of the plurality of moving wireless devices is the first ECH. The ECH_HELLO message broadcasts occur at randomly determined fixed intervals, such that each ECH has an interval that differs from other ECH nodes.

Additional means provide for receiving, by the first wireless device, at least second ECH_HELLO messages broadcast from at least a second moving wireless device operating as at least a second ECH, creating a linked equivalent cell network between the first and second ECH nodes if the second ECH is the only other ECH_HELLO message received or if two or more received ECH_HELLO messages belong to unlinked ECH nodes. However, if two or more received ECH_ HELLO messages belong to a unified chain of linked ECH nodes, the first device operates as a regular node in the linked equivalent cell network. The regular node is part of the linked equivalent cell network, but has restricted communication privileges in comparison to an ECH.

Further, means for detecting mobility of an ECH belonging to the equivalent cell network and means for electing a new ECH based upon a predetermined election criterion are provided.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF INVENTION

In accordance with the invention, nodes or moving devices are organized into manageable groups. These groups are used to coordinate transmission of data between the nodes. The groups are built based upon the relative location of neighboring nodes. This grouping or Local Peer Group ("LPG") is the basis for routing within a single LPG as well as between LPGs and organizing transmission in the ad-hoc wireless network according to the invention, to support wireless communications, including but not limited to, vehicle safety and information applications.

The purpose of the LPGs is to build degrees of coordination among neighboring nodes. These neighboring nodes are moving devices with wireless communications capabilities. Embodiments of moving devices include vehicles with associated communications devices which are installed the vehicles, or independently brought into the vehicles as well as pedestrians with communication devices. The preferred embodiment is moving vehicles with inherent communications devices. However, other communication devices, include cellular phones, PDAs, laptops, etc., may be used as part of the present invention, the only requirement being that the communication device support the wireless communication protocols necessary for the proper operation of the disclosed embodiments.

There are two types of degrees of coordination. A first type is a tight coordination of moving devices within immediate vicinity, which is used for intra-LPG communication that is used to support near-instantaneous messaging. For example, sending an urgent road-obstacle warning or another type of emergency or safety message would be performed using the intra-LPG messaging. These messages typically require 100 ms latency.

A second type is a loose coordination of moving devices in a neighborhood. This type of coordination is used to support inter-LPG communication among linked or interconnected LPGs. For example, inter-LPG communication can be used for roadway awareness application and for extending a driver's view.

An LPG is dynamically formed from a plurality of nodes in immediate vicinity. Specifically, a first node transmits a radio signal, other nodes within the range of the first have the ability to receive the radio signal. Since the LPG is formed based on radio coverage, nodes within an LPG can communicate with each other via a single-hop or a multi-hop without a need for any fixed infrastructure.

GLOSSARY OF TERMS

Before continuing further, several key terms commonly used throughout the present disclosure need to be defined.

The term 'equivalent cell' (also referred to as an EC) refers to a portion of a radio coverage area. An EC forms the basic organizing structure of an equivalent cell network.

The term 'equivalent cell header' (also referred to as an ECH) refers to a node that defines, maintains and manages an equivalent cell. An ECH may be unlinked or linked. In a linked EC network, the member ECH nodes provide the intra-network communication backbone; all messages within the network are broadcast from one ECH to another until the message reaches its destination.

The term 'regular node' refers to a member node of a linked EC network; the regular node has limited communication privileges within the network. A regular node, under certain circumstances, may become an ECH. The differences between a regular node and an ECH are strictly functional. Structurally both node types are identical, however, certain functions may or may not be active at a particular time depending on their node type at that time.

The term 'linked' refers to two or more ECHs in wireless communication with each other through a single radio hop or multiple radio hops. A linked ECH (or Linked EC) network may contain regular nodes associated with ECH nodes that are within a single radio hop communication range.

The term 'unlinked' refers to an ECH not in wireless communication with any other ECH. An unlinked ECH is the sole member ECH of its own network and does not have any associated regular nodes.

The term 'linked degree of k' refers to k number of radio hops linking two ECHs together. For example, if ECH A and ECH B are directly linked, then the link degree is 1, (i.e., k=1). If, however, ECH A and ECH B can detect each other, and ECH B and ECH C can detect each other, but ECH A and ECH C can not detect each other; the linked degree between ECH A and ECH C is 2 (i.e., k=2).

The term 'distinct ECH nodes' refers to ECH nodes that are not members of the same equivalent cell network. Distinct ECH nodes may be unlinked ECH nodes or they may be linked ECH nodes, but belonging to different equivalent cell networks.

The term 'mobility' refers to the movement of an ECH with respect to a linked EC network. More specifically, mobility refers to movement of an ECH into a linked EC network, out of a linked EC network of which it is a member, or from one EC into another EC managed by another ECH.

Formation of a Linked EC Network

Figure 1:
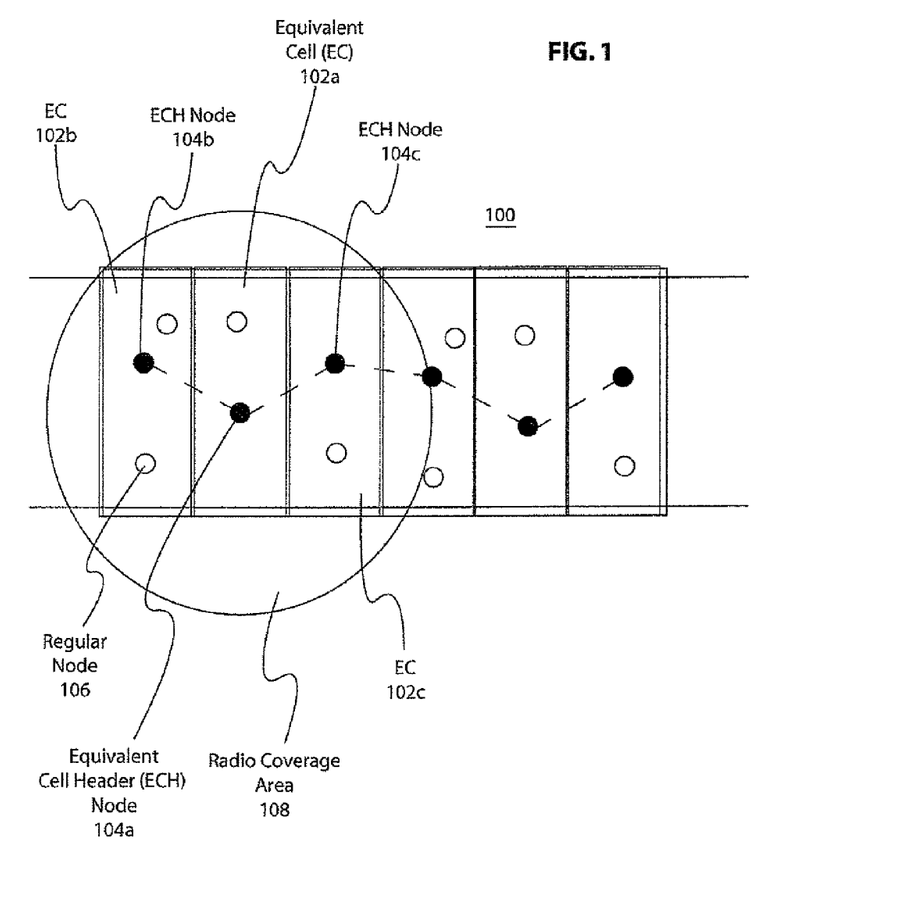
FIG. 1 illustrates an ad-hoc moving network, in accordance with the present invention.

Referring to FIG. 1, the present invention provides a local peer group, or linked equivalent cell network 100, that is dynamic and self-organizing. The basic building block of the linked equivalent cell network (L_EC) 100 is an equivalent cell (EC) 102a, which is centered on an equivalent cell header (ECH) 104a. A plurality of ECs 102a, 102b, 102c link together wirelessly to form an L_EC 100. Hereinafter, ECs 102a, 102b and 102c will be referred to collectively by numeral 102, and ECH nodes 104a, 104b and 104c will be referred to collectively by numeral 104.

The ECH 104a is a moving wireless networking device, such as a PDA, laptop, or vehicle-installed computing device. The ECH 104a is equipped with a radio-frequency transmitter/receiver having a radio coverage area 108 that extends outward from the ECH 104 in all directions. As shown in FIG. 1, the radio coverage area 108 is appreciably larger than the defined EC 102a area. While FIG. 1 shows the radio coverage area 108 encompassing three EC nodes 102a, 102b and 102c. It should be noted that this is merely illustrative and not meant to be interpreted as the sole configuration. Specifically, any number of ECs 102 may be dimensioned to occupy a defined radio coverage area. However, for the sake of simplifying the description of the present invention, an ECH node's radio coverage 108 encompasses three EC nodes 102 hereinafter.

The ECH nodes 104 provide the networking backbone of the L-EC 100. Specifically, all inter-EC communication is performed by the ECH nodes 104, as well as any transmission of control data. In addition, an ECH 104a manages operational parameters of its assigned EC 102a. Such operational parameters include tracking members, i.e., regular nodes 106 located in the EC 102b of the ECH node 104b, maintaining a list of other ECH nodes 104a, 104c in communication with EC node 104b, and its relative position within the L_EC 100. Regular nodes 106 are moving wireless network devices that are positioned within an EC 102. Any moving wireless device can operate as an ECH 104 or as a regular node 106.

Figure 2:
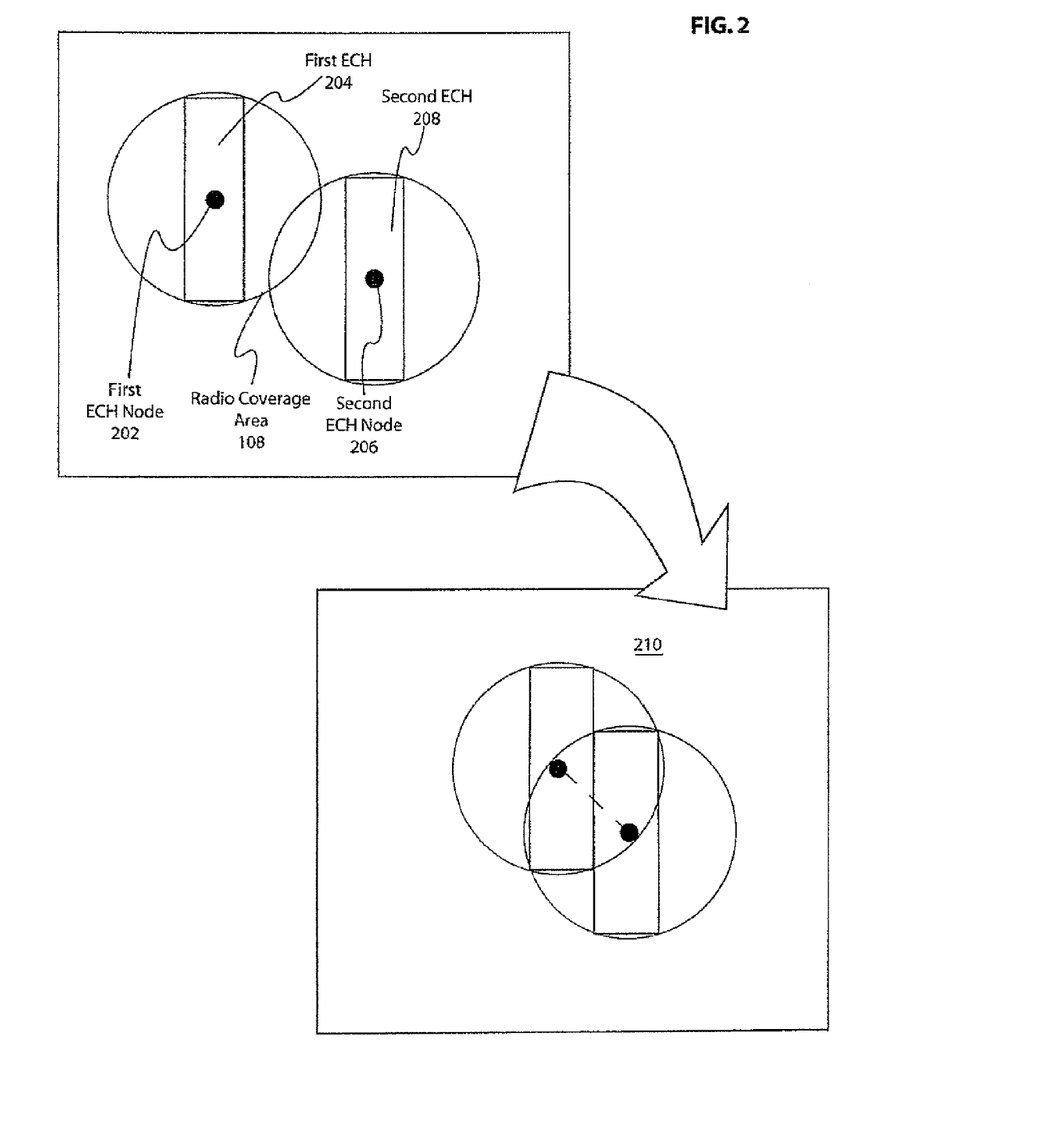
FIG. 2 illustrates initialization of an ad-hoc moving network by two unlinked equivalent cell headers, in accordance with the present invention.

With reference to FIG. 2, a description of the initialization and integration of the ad hoc network will be provided hereinafter. A node 202, or moving wireless device, begins by operating as an ECH and establishing an unlinked EC 204 of which it is the sole member. When ECH 202 detects broadcasts from a second ECH 206, the ECH 202 responds with an ECH_HELLO message providing identification information to the second ECH 206. The result is a linked EC 210 including ECH 202 and ECH 206, if ECH 206 is the only other ECH detected. Thus these two ECHs 202 and 206 have formed a network encompassing EC 204 and EC 208, or to extend a previously established network. Further, an unlinked ECH that detects two or more unlinked ECH nodes will form a network with the two or more unlinked ECH nodes and created a linked EC including all the detected ECH nodes.

Figure 3:
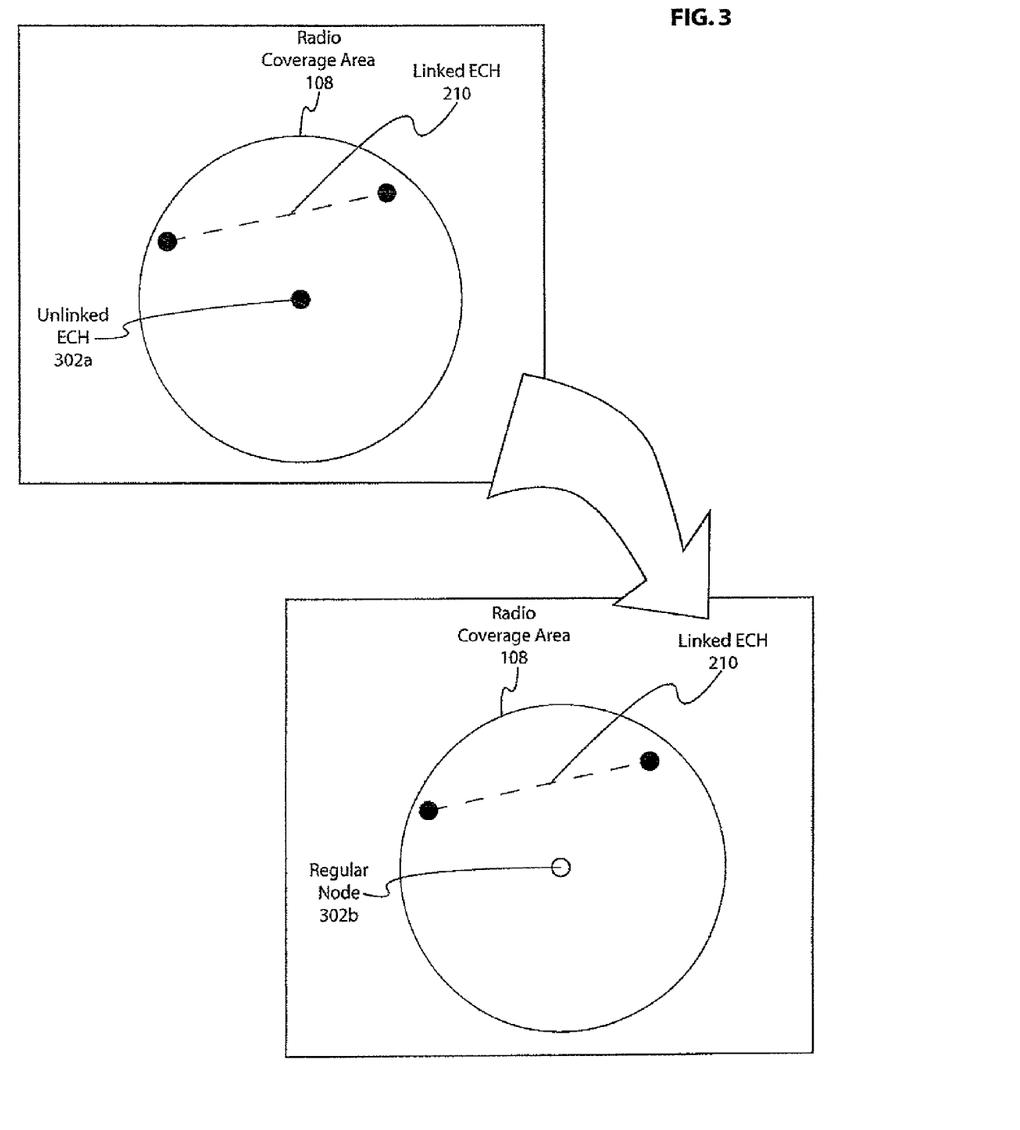
FIG. 3 illustrates a first case wherein an unlinked equivalent cell header encounters a linked equivalent cell network, in accordance with the present invention.

As additional unlinked ECH nodes encounter the linked EC 210, they are incorporated into the growing linked EC, as either an additional linked ECH or a regular node. Specifically, unlinked ECH nodes that detect two ECH nodes linked to each other become regular nodes. For example, in FIG. 3, unlinked ECH 302a would become regular node 302b. As regular nodes, these moving wireless devices can transmit and receive messages within the entire L_EC 100. However, all messages are routed through the ECH nodes 202 and 206 and not directly from regular node to regular node. In this way, bandwidth is conserved.

Figure 4:
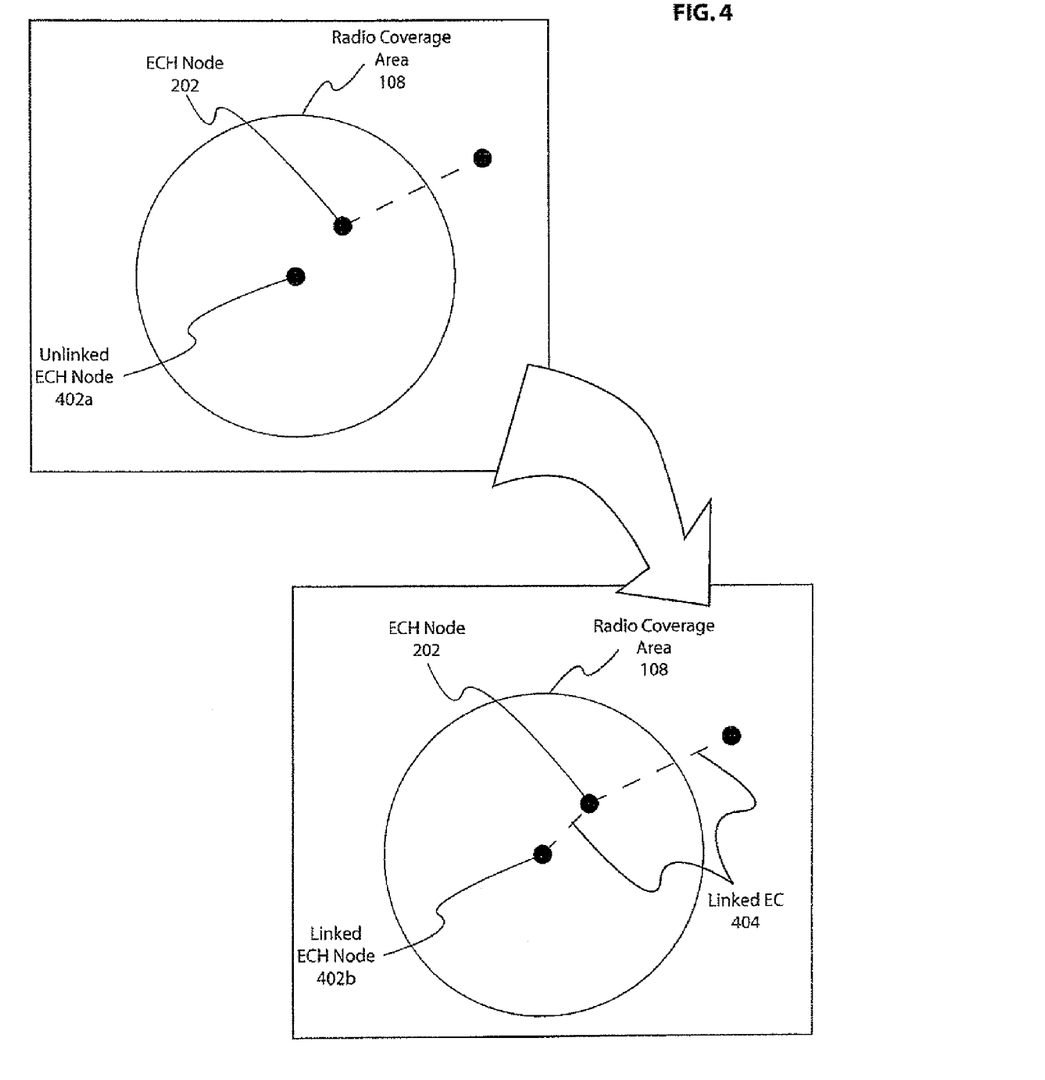
FIG. 4 illustrates a second case wherein an unlinked equivalent cell header encounters a linked equivalent cell network, in accordance with the present invention.

Alternatively as shown in FIG. 4, an unlinked ECH node 402a, which can only detect one other ECH 202, whether part of a L_EC or not, will link to the detected ECH 202 and extend the length of the linked EC 404, thus becoming a linked ECH 402b.

A regular node becomes an ECH if the regular node detects only one ECH and then links to that detected ECH to form a linked EC network. Additionally, a regular node or an unlinked ECH will become a linked ECH, if the node detects itself to be a "linker".

A linker is a node (regular or ECH) that detects more than one distinct ECH, where the detected ECH nodes are not members of the same EC network. These distinct ECH nodes may be unlinked ECH nodes, linked ECH nodes belonging to different networks, or a combination of both.

When a regular node detects itself to be a linker, the regular node becomes a new ECH and connects the more than one distinct ECH to form one larger network. The regular node detects whether the ECH node is part of a network through receipt of the ECH node's list of ECH nodes that are members of its linked EC network (herein referred to as LECH list). The LECH list is contained in the ECH message. The regular node will determine that it is a "linker" by comparing each of the more than one distinct ECH nodes' LECH lists.

Figure 5:
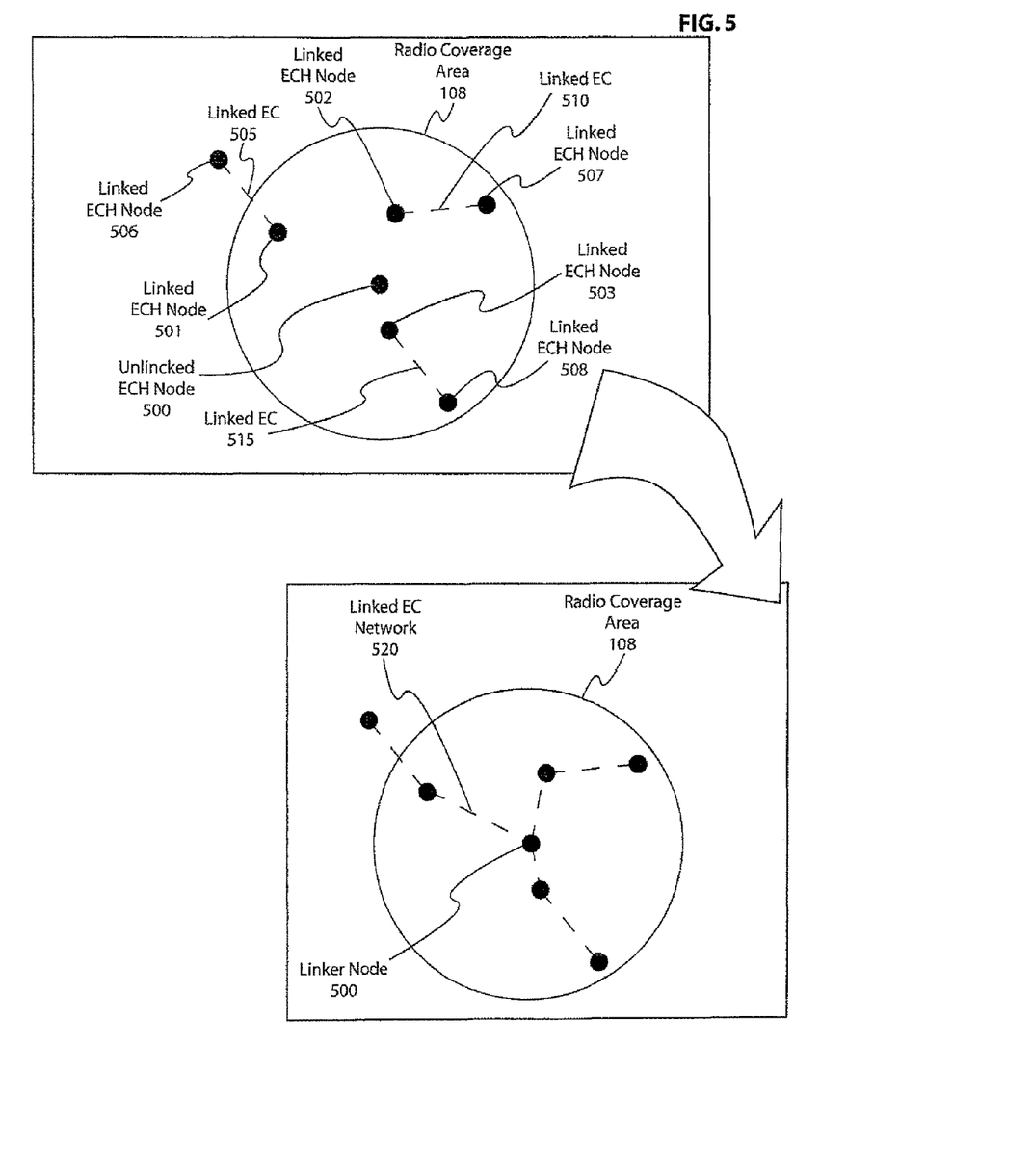
FIG. 5 illustrates a third case where an unlinked equivalent cell header encounters an existing linked equivalent cell network in accordance with the present invention.

The ECH messages broadcast by distinct ECH nodes will not have any ECH nodes shared between their lists, i.e., no ECH will be on both lists. An unlinked ECH node's LECH list only contains a reference to itself, since it is the only ECH in its network. For example in FIG. 5, unlinked ECH 500 can receive an ECH_HELLO message from three linked ECHs, 501-503, respectively. ECH 501 is linked to ECH 506 to form a linked EC 505, ECH 502 is linked to ECH 507 to form a linked EC 510 and ECH 503 is linked to ECH 508 to form a linked EC 515. Upon receipt of the three ECH_HELLO messages, the unlinked ECH 500 will determine whether any ECH is commonly listed in two or more ECH lists. In this case, the three linked ECH lists do not have any overlapping members, thus unlinked ECH 500 will determine that it is a "linker" node and link all three separate and distinct linked ECs 505, 510, and 515 together to form one linked network 520. A similar evaluation would be performed by a regular node to determine if it is a "linker" node.

A linked EC is maintained via control messages transmitted in ECH_HELLO message. The ECH_HELLO message is transmitted by each ECH at predefined intervals. The regular nodes only receive the ECH_HELLO messages but do not respond. Failure to receive any ECH_HELLO messages by a regular node or linked ECH node, results in that node becoming an unlinked ECH.

Preferably, ECH_HELLO messages contain an ID of the source originating the message, a sequence number identifying the number of the current message sent by the source, a first list of ECH nodes (LECH list) that are visible to the source along a first communication path of the L_EC, and a second LECH list for a second communication path of the L_EC. Additional LECH lists may be provided, wherein each LECH list contains ECH IDs for all ECH nodes encountered along one branch, or communication path, of the L_EC, with the source ECH as the epicenter. Further, ECH_HELLO messages also may include a timeout value, which notifies the other ECH nodes and regular nodes the maximum period of elapsed time between receipt of the current ECH_HELLO message and the next ECH_HELLO message, thus providing a means for determining if a particular ECH is still present in the linked EC network.

Each L_EC is distinguished by an LPG_ID. A group of linked ECH nodes forms an L_EC, which is then assigned an LPG_ID. The number of linked ECHs in an L_EC can be defined flexibly with the considerations of operational performance or environmental conditions such as population or distribution of mobile devices (i.e., nodes) in the network. Through an ECH_HELLO message, an LPG_ID is distributed to the member ECH nodes and regular nodes. In this way, the regular nodes know to which L_EC they currently belong.

The LPG_ID is a unique identifier of a particular L_EC to which it is assigned. Accordingly, the LPG_ID may be created based on unique properties of the particular L_EC, such as a combination of the member ECH nodes' IDs or some other distinguishing information. Alternatively, the LPG_ID may be a randomly generated code. In such a case, the number of bits or characters forming the code determines the uniqueness of the LPG_ID; longer code lengths are less likely to be randomly repeated than are shorter code lengths.

Mobility Detection and ECH Election

Mobility detection as defined herein refers to detection of movement of an ECH into and out of the linked EC, as well as movement into another EC. While movement of regular nodes do not affect the operation of the linked EC network, movement of ECH nodes can result in inefficient operation or breakdown of the linked EC network. Mobility can cause ECH nodes having overlapping ECs, resulting in inefficient transmission of data at that area of the network due to messages being rebroadcast too close together, thus requiring more time to propagate a given length of the network. Alternatively, mobility can have the opposite effect as well, wherein an ECH node's movement causes a gap to form between the radio coverage ranges of two ECH nodes, essentially resulting in a breakup of the linked EC network at that point, because messages cannot propagate across that gap.

To correct for mobility in a linked EC network, mobility detection is required. Mobility detection can be performed passively or actively. The passive mobility detection method uses ECH_HELLO messages to detect mobility of a node. Specifically, the method requires a preset time to elapse before any surrounding ECH or regular node can detect the departure of an ECH.

Every ECH operates based upon its own timers, each ECH sends its ECH_HELLO message every T seconds. For a period T, every ECH (and regular node as well) collects the ECH_HELLO messages from its neighboring ECH nodes. Based upon the collected messages, it will update its LECH list and outgoing ECH_HELLO message. In order to maintain an updated list of ECH nodes, the ECH nodes will automatically remove an ECH from the ECH list after an expiration of a predefined time period where no ECH_HELLO message has been received from the ECH. The expiration time or predefined time period must be greater than T, for example 3T. The speed of this detection totally depends on the period of ECH_HELLO, T. Once the ECH_HELLO message from an ECH is received, the timer is reset or restarted. A timer is used to track the ECH_HELLO message for all of the ECHs within the ECH list.

However, the list is updated, i.e., old ECHs that are no longer present in the linked EC network are removed only after the expiration of the predefined time period. There is a potential for an ECH to have moved from broadcast range, but still be listed in the ECH list. This passive method could result in the interruption of a message being forwarded, and affect the performance of the L_EC network. Accordingly, an active mobility detection method can be used to provide faster detection and resolution of ECH mobility.

In an active mobility detection, a new control message M_DETECT is used in combination with the ECH_HELLO message. Thus, mobility can be detected in less time, i.e., less than T. The M_DETECT message includes the sender's ID and the ID of the ECH suspected of mobility (mECH), i.e., the ECH that has moved away from its original position or left the linked EC network all together. The M_DETECT message is sent by an ECH that has received an unexpected ECH_HELLO message. The M_DETECT message is directed to both ECH and regular nodes within a one-hop range of the sender, and associated with either the sending ECH or the mECH.

Figure 6:
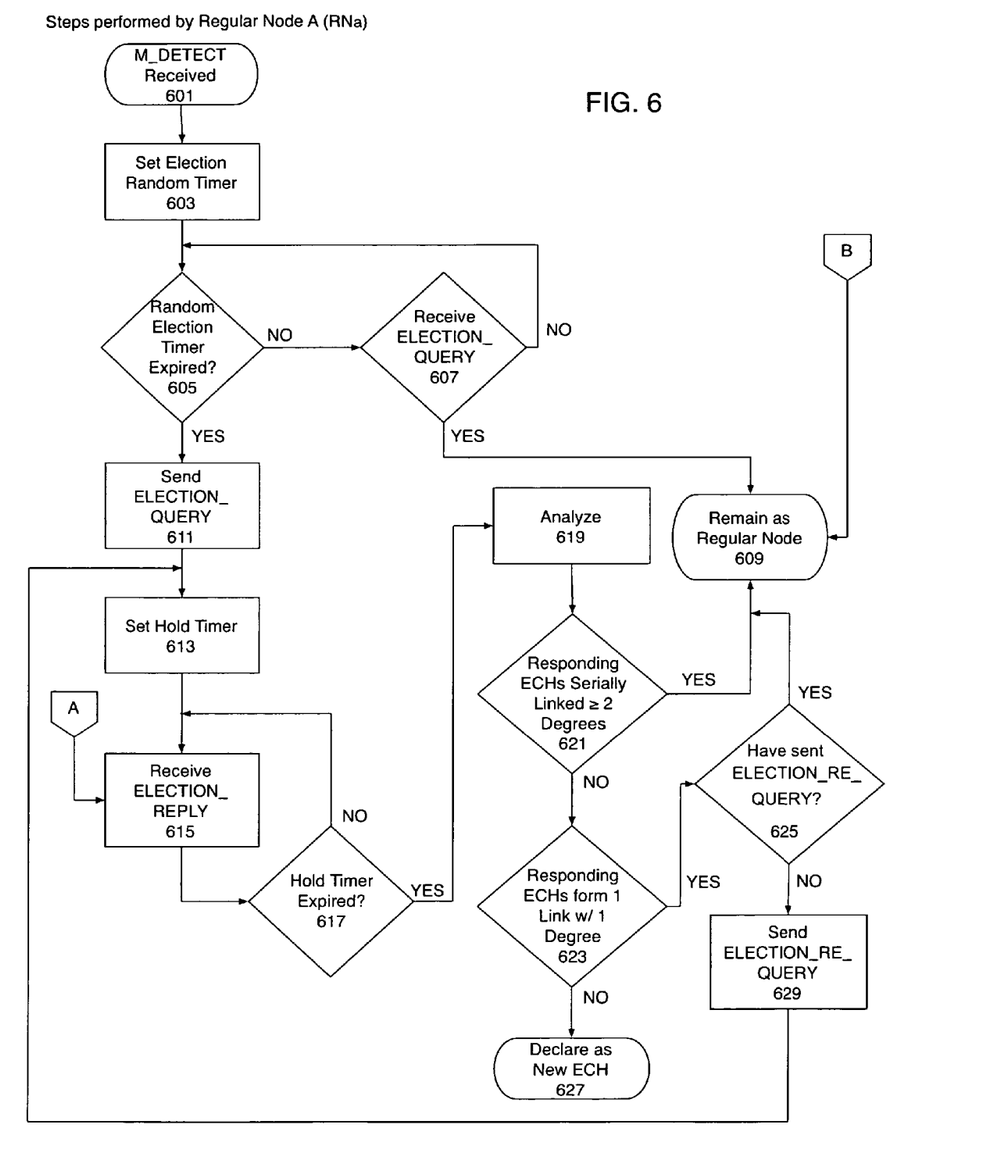
FIG. 6 is a flow diagram showing the steps for performing active mobility detection according to an embodiment of the invention.

FIG. 6 illustrates a flow diagram for the active mobility detection method. The method starts when a regular node ($RN_a$) receives an M_DETECT message at step 601. Once the message is received, the regular nodes start engaging in the ECH election at step 603. The first step in the regular node's ECH election process is setting a timer (election-random-timer) to a random value (e.g., range from 0 to k where k is less than T Hello period) in step 603. The election-random-timer is set to a random period to avoid multiple election invocations. If the election-random-timer expires at step 605, the regular node broadcasts an ELECTION_QUERY message in step 611, and sets a second timer, or hold timer (e.g., 4/T), at step 613. The regular node then waits for receipt of responses in the form of ELECTION_REPLY messages from nearby ECH nodes at step 615. A nearby ECH is an ECH within a one-hop broadcast distance, i.e., no relay is needed. Other regular nodes with still-running election-random-timer, upon receiving an ELECTION_QUERY message immediately stop their election-random-timers and remain as regular nodes.

At the same time, when an ECH receives the ELECTION_QUERY, the ECH sets a random timer, such as a reply-random-timer (e.g., the range from 0 to h where h is about 4/T). While the reply-random-timer elapses, the ECH listens for ELECTION_REPLY messages from other ECH nodes. Once the reply-random-timer expires, the ECH creates and broadcasts its own ELECTION_REPLY message containing the sender's ID, query sources ID, and IDs of all ECH nodes detected through receipt of ELECTION_REPLY messages during reply-random-timer elapse.

The hold timer will be monitored to determine when it expires. Once the hold timer expires at step 617, the regular node collects the ELECTION_REPLY messages broadcast by the ECHs and analyzes the link status to determine whether the regular node should become an ECH or not in step 619. If it is determined in step 621 that the responding ECH nodes are serially linked with at least a degree of 2, the process proceeds to step 609, where the regular node remains a regular node. If it is determined in step 623 that the responding ECH nodes form only one link with a degree of 1, the process proceeds to step 625, where the regular node determines if it has previously broadcast an ELECTION_RE_QUERY message. The ELECTION_RE_QUERY message includes the sender's ID and IDs of all the ECH nodes detected in the previous query.

If the regular node had previously sent an ELECTION_RE_QUERY message, then the process proceeds to step 609 and the regular node remains as a regular node. However, if the regular node had not previously sent an ELECTION_RE_QUERY message, then the regular node sends an ELECTION_RE_QUERY message at step 629, since the node cannot make a decision based upon the current information collected. After the regular node broadcasts the ELECTION_RE_QUERY message, the process proceeds to step 613.

However, if the condition of step 623 is not met, the regular node declares itself as an ECH in step 627 and broadcasts a FRESH message containing the sender's ID, which is set as a new ECH ID, and the old ECH ID. Thus, the receivers of the FRESH message are informed that the old ECH ID is replaced by the new ECH ID and so each receiver of the FRESH message updates their current LECH list accordingly.

Figure 7:
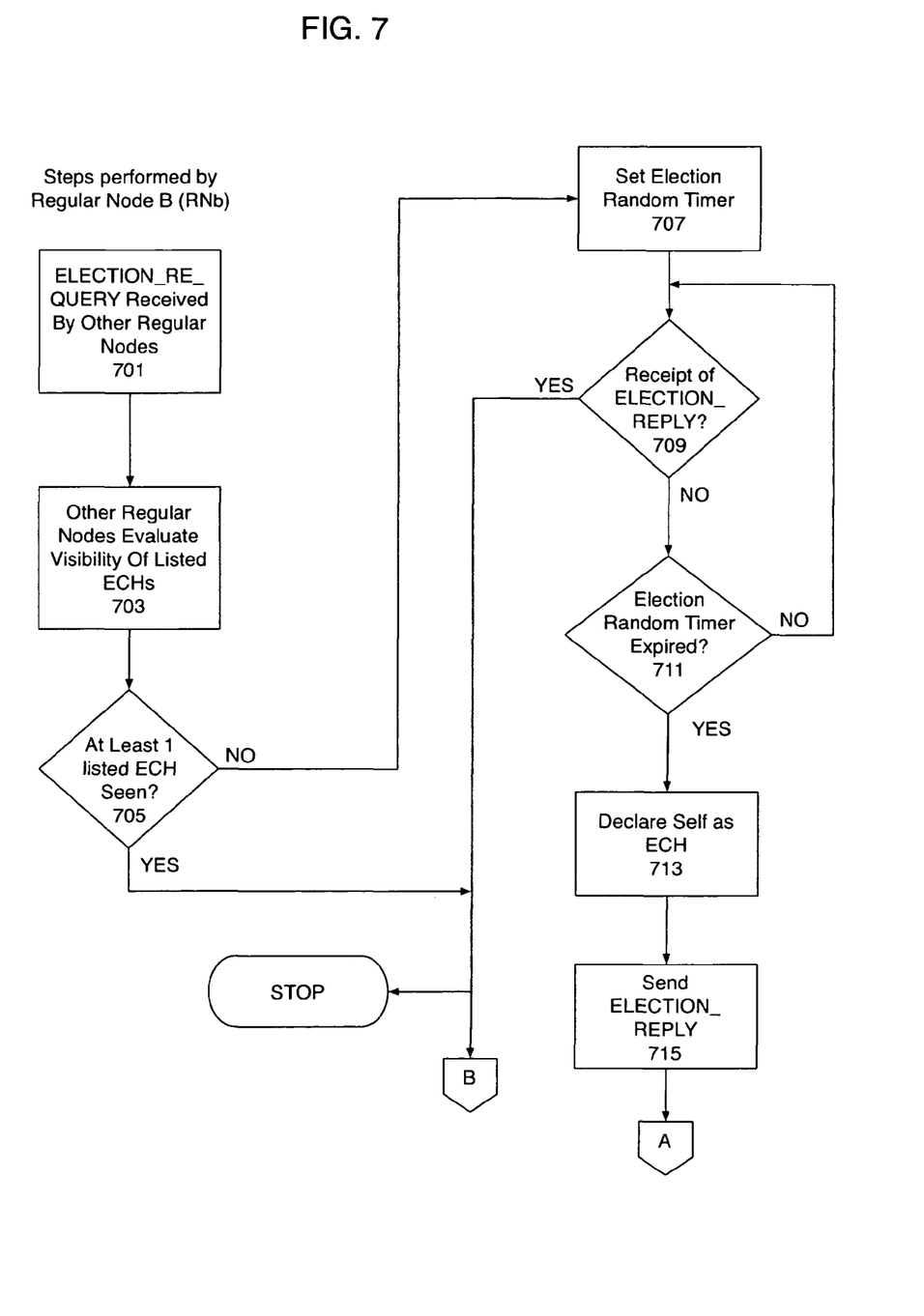
FIG. 7 is a continuation of the active mobility detection flow diagram of FIG. 6.

In the case where $RN_a$ broadcasts an ELECTION_RE_QUERY message in step 629, FIG. 7 illustrates the procedure performed in response to the broadcast message. In step 701, a regular node ($RN_b$) receives the ELECTION_RE_QUERY message broadcast by $RN_a$. There may be multiple regular nodes performing this step, as well as the subsequent steps described below, near $RN_b$. $RN_b$ evaluates the visibility of the ECH nodes listed in the ELECTION_RE_QUERY message in step 703. Proceeding to step 705, if $RN_b$ fails to see any of the listed ECH nodes, then $RN_b$ proceeds to step 707 where an election-random-timer is set. During the interval set for the election-random-timer, the $RN_b$ awaits receipt of an ELECTION_REPLY message broadcast by a newly elected ECH node, as shown in step 709. If the election-random-timer expires in step 711 before $RN_b$ receives an ELECTION_REPLY message, then $RN_b$ declares itself as an ECH in step 713. The new ECH sends an ELECTION_REPLY message in step 715. However, if at step 709, an ELECTION_REPLY message is received prior to expiration of the $RN_b$'s election random timer, then $RN_b$ remains a regular node. Returning to step 705, if at least one ECH listed in the ELECTION_RE_QUERY is visible to $RN_b$, then $RN_b$ remains a regular node.

After a regular node becomes an ECH, the node will inform the other ECH nodes in the linked EC network of its status change by broadcasting the FRESH message. This message promptly causes the receiving ECH nodes to update their LECH lists, which would have been outdated by the movement. If the old ECH receives the FRESH message, the old ECH demotes itself to a regular node.

In the preferred embodiment, both passive and active mobility detection are used, however either detection method may be used separately as well.

The values for the various timers, e.g., election-random-timer, hold timer and ECH_HELLO message timer, are randomly predetermined, however, the selected random time is chosen to account for the operational performance of each function and delay requirement for the operation. However, the election-random-timer and hold timer have values that are preferably much less than 1T, where T is equal to ECH_HELLO Period. Thus, the ECH election operation responds to ECH mobility within 1T.

Linked EC Network Merging and Splitting

When more than one linked EC network enters close proximity to each other, the linked EC networks can merge into each other. However, the entire linked EC network does not "merge" into the other linked EC network, rather the proximate ECH nodes link together. Specifically, the ECH nodes will exchange the ECH_HELLO messages as they move closer together. Through the exchange of the ECH_HELLO message the ECH nodes will obtain information regarding each other's linked EC network, such as the linked EC network ID (LPG_ID), the identities of the member ECH nodes, the regular nodes, and the number of ECH nodes in the LPG.

If the combined size of the merging linked EC networks is smaller than (or equal to) a predetermined maximum LPG size, then the merging linked EC networks will form one larger linked EC network. The proximate ECH nodes become linked to each other, effectively creating one network from all of the combined ECHs. However, if the combined size of the merging linked EC networks is larger than the predetermined maximum LPG size, then the merging linked EC networks will form two new linked EC networks that may differ in size and member ECH nodes from the original merging linked EC networks. Any number of linked EC networks can merge, provided that the total number of ECH nodes does not exceed the predetermined maximum LPG size.

A linked EC network may split into two new linked EC networks if the predetermined maximum LPG size is surpassed. However, such linked EC network splitting is relatively rare; most of the time, a linked EC network contains a number of ECH nodes that is less than the predetermined maximum LPG size. If a linked EC network contains a number of ECH nodes greater than the predetermined maximum LPG size, it will split into two linked EC networks whose individual sizes are smaller than the maximum LPG size.

An ECH can obtain the current size of its linked EC network from its LECH list: each entry in the LECH list includes an ECH_ID and the corresponding LPG_ID. If an ECH detects that its LPG size is greater than the predetermined maximum LPG size, it will invoke a splitting process by issuing a FRESH message that includes a new LPG_ID and a new set of LECH lists reflecting the ECH node membership of the new LPG_ID. Upon receipt of this message, the ECH nodes listed in the new set of LECH lists will update their LPG_IDs with the new LPG_ID.

Preferably, the maximum number of ECH nodes in a linked EC network is defined and flexibly controlled during the operation with the considerations of operational performance, performance of wireless data traffic, and roadway environments such as population or distribution of vehicles on roadway. For example, a smaller number of ECH nodes, in general, lower the loading on wireless bandwidth and results in better performance (in terms of lower latency) at the cost of underutilized wireless bandwidth. Contrastingly, increasing the number of ECH nodes tends to increase the loading and is more suitable for best-effort applications.

The relative position of ECH nodes in the LECH list of an ECH is consistent with those of other ECH nodes. So, according to the LECH list, each ECH knows which ECH is the beginning and ending ECH for a particular linked EC network if the size of the LECH list were long enough (~2*Max number of ECH nodes in a linked EC network). Also, in the case of linked EC network splitting, ECH nodes can anticipate which ECH should invoke linked EC network splitting. For example, the ECH that is positioned at the max number-plus-1 may be predisposed to invoke the linked EC network splitting.

In other words, each ECH knows the number of ECH nodes in the LECH list and its own position within the LECH list. So, when a splitting is needed (e.g., exceeding the predetermined maximum size), some predetermined policy may be used to select a split position. In a first case, the split can take place at around the mid-point of the LECH list. Splitting would be initiated by the two ECH nodes located around the mid-point (since each ECH knows its position in the list) to initiate the split process. In an alternative case, splitting occurs at the maximum-size-plus-1 position. Thus, splitting is initiated by the two ECH nodes located at the maximum-size-position and the maximum-size-plus-1 position. After the split, the two newly formed linked EC networks communicate with one another through the ECH nodes located at the boundary between the two resulting linked EC networks.

Figure 8:
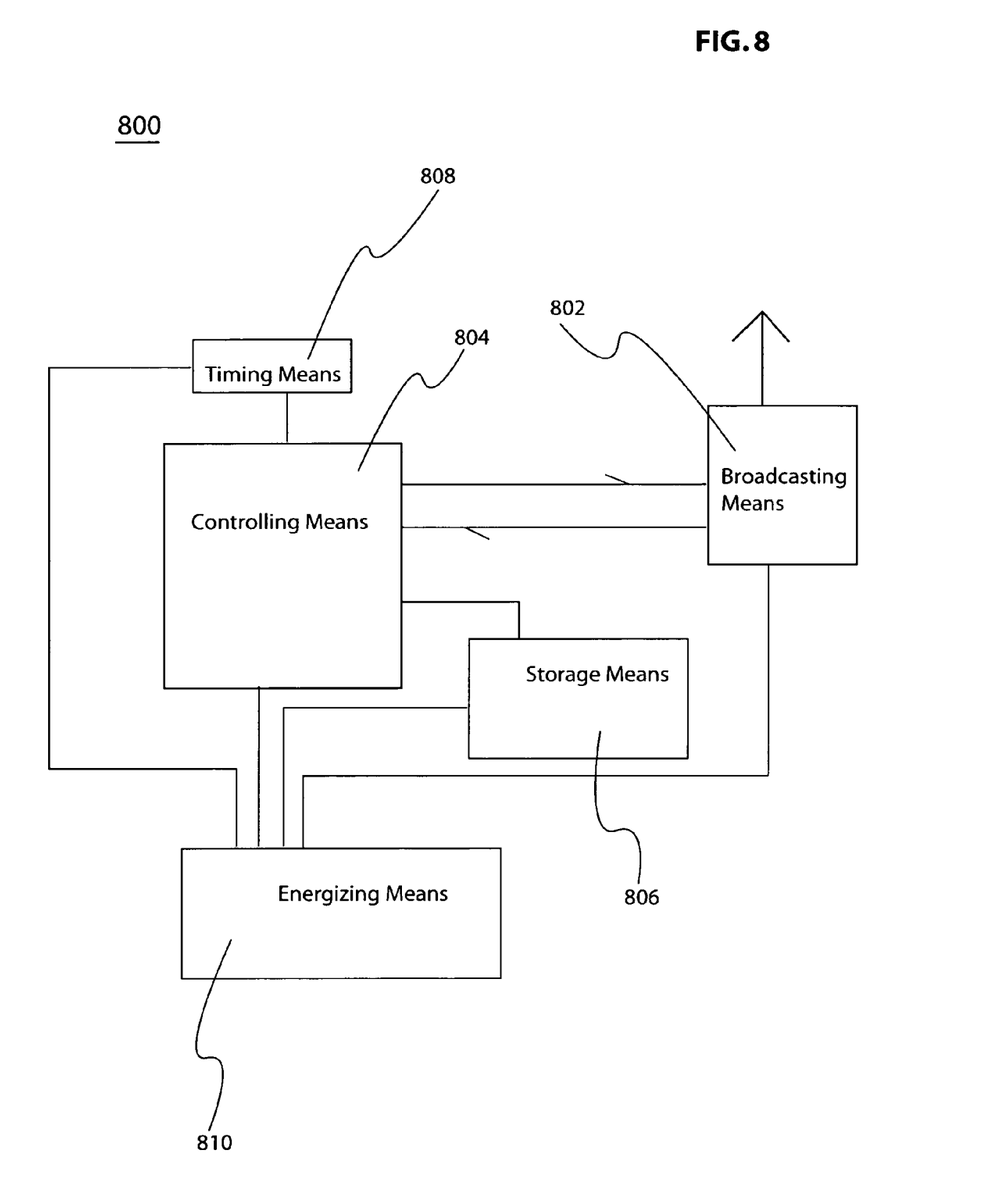
FIG. 8 illustrates a block representation of a system for creating and maintaining an ad-hoc network according to an embodiment of the present invention.

Referring to FIG. 8, the above-described protocols are performed by a computing device 800 having a broadcasting means 802, such as a wireless transceiver, for providing wireless communication between nodes in a radio coverage range. Additionally, a controlling means 804, e.g., microcontroller, microprocessor, etc., is configured for receiving signals from other nodes through the broadcasting means 802 and transmitting signals to other nodes through the broadcasting means 802. The controlling means 804 also provides operational control by executing the above-described protocols as processor-executable instructions. A storage means 806 is disposed within the computing device 800 and in operational communication with the controlling means 804. The storage means 806 may be memory modules, removable media, a combination of multiple storage devices, etc. and is dimensioned to store the processor-executable instructions necessary for the performance of the protocols of the described embodiments. Further, a timing means 808 is provided either as a separate component or via a function of the controlling means 804. The timing means 808 provides the time interval tracking necessary for each of the timers referred to in the described embodiments. An energizing means 810, such as a power supply, is electrically connected to all the components of the computing device 800 for providing operational power to the components as necessary.

The processor-executable instructions for performing the described embodiments may be embedded in the storage means 806 in a form such as an EPROM, Flash memory or other such non-volatile storage. Additionally, the processor-executable instructions may be stored on a computer readable media such as an optical or magnetic medium, or may be downloadable over a network (e.g., Internet). Preferably, the processor-executable instructions can be updated by a user periodically, as necessary, in order to provide additional enhancements to the system as they become available.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method for establishing and maintaining a mobile ad-hoc network between a plurality of moving wireless devices having the same communication capabilities, said method comprising:
   operating a first device of said plurality of moving wireless devices as a first equivalent cell header (ECH), said first ECH having a radio coverage range, the first ECH being initially an unlinked ECH;
   establishing a first equivalent cell (EC) for said first ECH, said first EC being formed centralized within an area of a radio coverage range of said first ECH and dimensioned to occupy a portion of said area, said first EC being managed by said first ECH;
   broadcasting ECH information (ECH_HELLO) message from said first ECH, said ECH_HELLO message announcing that said one device of said plurality of moving wireless devices is the first ECH, said ECH_HELLO message broadcasts occurring at randomly determined fixed intervals;
   receiving, by said first wireless device, second ECH_HELLO messages broadcast from at least a second moving wireless device operating as at least a second ECH;
   determining if at least the second ECH is a linked ECH with another ECH based on if two or more received ECH_HELLO messages belong to a unified chain of linked ECHs;
   becoming a regular node in a linked equivalent cell network formed by at least the second ECH and the another ECH based upon the determining, the regular node being part of said linked equivalent cell network and within the radio coverage range of the linked ECHs and said regular nodes having restricted communication privileges in comparison to an ECH; and
   creating a linked equivalent cell network between said first and at least the second ECH, if said at least the second ECH is the only other ECH_HELLO message received or if two or more received ECH_HELLO messages belong to unlinked ECHs; and
   wherein communication is routed and broadcast by and between ECHs forming said linked equivalent cell network, and regular nodes communicate directly and exclusively with an ECH forming an EC in which the regular nodes are located.

2. The method as in claim 1, wherein said regular node becomes a new ECH when said regular node receives only one ECH_HELLO message, said new ECH links with an ECH that transmitted said received ECH_HELLO message, and wherein said regular node becomes a new ECH when said regular node receives at least one ECH_HELLO message from an unlinked ECH.

3. The method as in claim 1, wherein said regular node becomes a new ECH when said regular node receives at least two ECH_HELLO messages from at least two different ECH nodes belonging to different networks, said new ECH links said at least two different ECH nodes belonging to different EC networks together to create one unified network.

4. The method as in claim 1, wherein an ECH provide a communication link between said ECH and other ECHs and between regular nodes from different equivalent cells belonging to said linked EC network.

5. The method as in claim 1, wherein said area of said radio coverage range includes multiple other equivalent cells in addition to said centralized equivalent cell, each EC being managed by a unique ECH.

6. The method as in claim 5, wherein each linked ECH is aware of a relative position of itself with respect to other ECH nodes in said linked EC network, said relative position being determined from at least one list of ECH nodes in communication, each list of said at least one list of ECH nodes being indicative of an order of ECH nodes along one communication path of said linked equivalent cell network.

7. The method as in claim 1, further comprising:
   detecting mobility of an ECH belonging to said equivalent cell network based upon a receipt of an unexpected ECH_HELLO message;
   transmitting a mobility detection message; and
   electing a new ECH based upon a predetermined election criterion.

8. The method as in claim 7, wherein said ECH election is performed by selectively promoting a regular node to an ECH, said regular node being selected based on a position of said regular node relative to said equivalent cell managed by said detected ECH.

9. The method as in claim 7, said mobility includes: a new ECH joining said EC network, a linked ECH leaving said EC network, and a linked ECH moving into an EC managed by another ECH of the same EC network.

10. The method as in claim 1, wherein at least one device of said plurality of moving wireless devices is installed or embedded in a vehicle.

11. The method as in claim 1, wherein the regular node does not transmit a response to the two or more received ECH_HELLO messages.

12. A system for establishing a mobile ad-hoc network between a plurality of moving wireless devices having the same communication capabilities, said system comprising:
   means for operating a first device of said plurality of moving wireless devices as a first equivalent cell header (ECH), said ECH having a radio coverage range, the first ECH being initially an unlinked ECH;
   means for broadcasting ECH information (ECH_HELLO) message from said first ECH, said ECH_HELLO message announcing that said one device of said plurality of moving wireless devices is the first ECH, said ECH_HELLO message broadcasts occurring at randomly determined fixed intervals;
   means for establishing a first equivalent cell (EC) for said first ECH, said first EC being formed centralized within an area of a radio coverage range of said first ECH and dimensioned to occupy a portion of said area, said EC being managed by said ECH;
   means for receiving, by said first wireless device, second ECH_HELLO messages broadcast from at least a second moving wireless device operating as at least a second ECH;
   means for determining if at least the second ECH is a linked ECH with another ECH based on if two or more received ECH_HELLO messages belong to a unified chain of linked ECHs;
   means for becoming a regular node in a linked equivalent cell network formed by at least the second ECH and the another ECH based upon the determining, the regular node being part of said linked equivalent cell network and within the radio coverage range of the linked ECHs and said regular nodes having restricted communication privileges in comparison to an ECH; and means for creating a linked equivalent cell network between said first and at least the second ECH nodes, if said at least the second ECH is the only other ECH_HELLO message received or if two or more received ECH_HELLO messages belong to unlinked ECH nodes;

wherein communication is routed and broadcast by and between ECHs forming said linked equivalent cell network, and regular nodes communicate directly and exclusively with an ECH forming an EC in which the regular nodes are located.

13. The system as in claim 12, wherein said regular node becomes a new ECH when said regular node receives only one ECH_HELLO message, said new ECH links with an ECH that transmitted said received ECH_HELLO message, and wherein said regular node becomes a new ECH when said regular node receives at least one ECH_HELLO message from an unlinked ECH.

14. The system as in claim 12, wherein said regular node becomes a new ECH when said regular node receives at least two ECH_HELLO message from at least two different linked ECH nodes belonging to different networks, said new ECH links said at least two different linked ECH nodes belonging to different networks together to create one unified network.

15. The system as in claim 12 wherein each ECH provides a communication link between each other and between regular nodes from different equivalent cells belonging to said linked equivalent cell network.

16. The system as in claim 15, wherein said area of said radio coverage range includes multiple other equivalent cells in addition to said centralized equivalent cell, each equivalent cell being managed by a unique ECH and forming a linked equivalent cell network.

17. The system as in claim 12, wherein an ECH is aware of a relative position of an equivalent cell managed by said ECH, said relative position being determined from at least one list of ECHs in communication, each list of said at least one list of ECHs being indicative of ECHs in communication along one communication path of said linked equivalent cell network.

18. The system as in claim 12, further comprising:
means for detecting mobility of an ECH belonging to said equivalent cell network based upon a receipt of an unexpected ECH_HELLO message;
means for transmitting a mobility detection message; and
means for electing a new ECH based upon a predetermined election criterion.

19. The system as in claim 18, wherein said ECH election is performed by selectively promoting a regular node to an ECH, said regular node being selected based on a position of said regular node relative to said equivalent cell managed by said detected ECH.

20. The system as in claim 12, wherein at least one device of said plurality of moving wireless devices is installed or embedded in a moving vehicle.

21. A non-transitory computer-readable medium having a set of instructions executable by a processor for performing a method for establishing a mobile ad-hoc network between a plurality of moving wireless devices having the same communication capabilities, said method comprising:
operating a first device of said plurality of moving wireless devices as a first equivalent cell header (ECH), said ECH having a radio coverage range, the first ECH being initially an unlinked ECH;
establishing a first equivalent cell (EC) for said first ECH, said first EC being formed centralized within an area of a radio coverage range of said first ECH and dimensioned to occupy a portion of said area, said EC being managed by said ECH;
broadcasting ECH information (ECH_HELLO) message from said first ECH, said ECH_HELLO message announcing that said one device of said plurality of moving wireless devices is the first ECH, said ECH_HELLO message broadcasts occurring at randomly determined fixed intervals;
receiving, by said first wireless device, second ECH_HELLO messages broadcast from at least a second moving wireless device operating as at least a second ECH;
determining if at least the second ECH is a linked ECH with another ECH based on if two or more received ECH_HELLO messages belong to a unified chain of linked ECHs;
becoming a regular node in a linked equivalent cell network fanned by at least second ECH and the another ECH based upon the determining, the regular node being part of said linked equivalent cell network and within the radio coverage range of the linked ECHs and said regular nodes having restricted communication privileges in comparison to an ECH; and
creating a linked equivalent cell network between said first and at least the second ECH nodes, if said at least the second ECH is the only other ECH_HELLO message received or if two or more received ECH_HELLO messages belong to unlinked ECH nodes;
wherein communication is routed and broadcast by and between ECHs forming said linked equivalent cell network, and regular nodes communicate directly and exclusively with an ECH forming an EC in which the regular nodes are located.

22. The non-transitory computer-readable medium as in claim 21, wherein said method further comprises:
detecting mobility of an ECH belonging to said equivalent cell network based upon a receipt of an unexpected ECH_HELLO message;
transmitting a mobility detection message; and
electing a new ECH based upon a predetermined election criterion, said ECH election is performed by selectively promoting a regular node to an ECH, said regular node being selected based on a position of said regular node relative to said equivalent cell managed by said detected ECH.

* * * * *

UNITED STATES PATENT AND TRADEMARK OFFICE
CERTIFICATE OF CORRECTION

PATENT NO. : 8,554,920 B2
APPLICATION NO. : 11/284731
DATED : October 8, 2013
INVENTOR(S) : Chen et al.

It is certified that error appears in the above-identified patent and that said Letters Patent is hereby corrected as shown below:

On Title Page 2, Item (56), under "OTHER PUBLICATIONS", in Column 1, Line 7, delete "Implemention"," and insert -- Implementation", --, therefor.

In the Specification

In Column 7, Line 11, delete "EC node 104b," and insert -- ECH node 104b, --, therefor.

In the Claims

In Column 15, Line 29, in Claim 15, delete "claim 12" and insert -- claim 12, --, therefor.

In Column 16, Line 29, in Claim 21, delete "fanned" and insert -- formed --, therefor.

Signed and Sealed this
Eighteenth Day of November, 2014

Michelle K. Lee
*Deputy Director of the United States Patent and Trademark Office*